Patented Jan. 15, 1929.

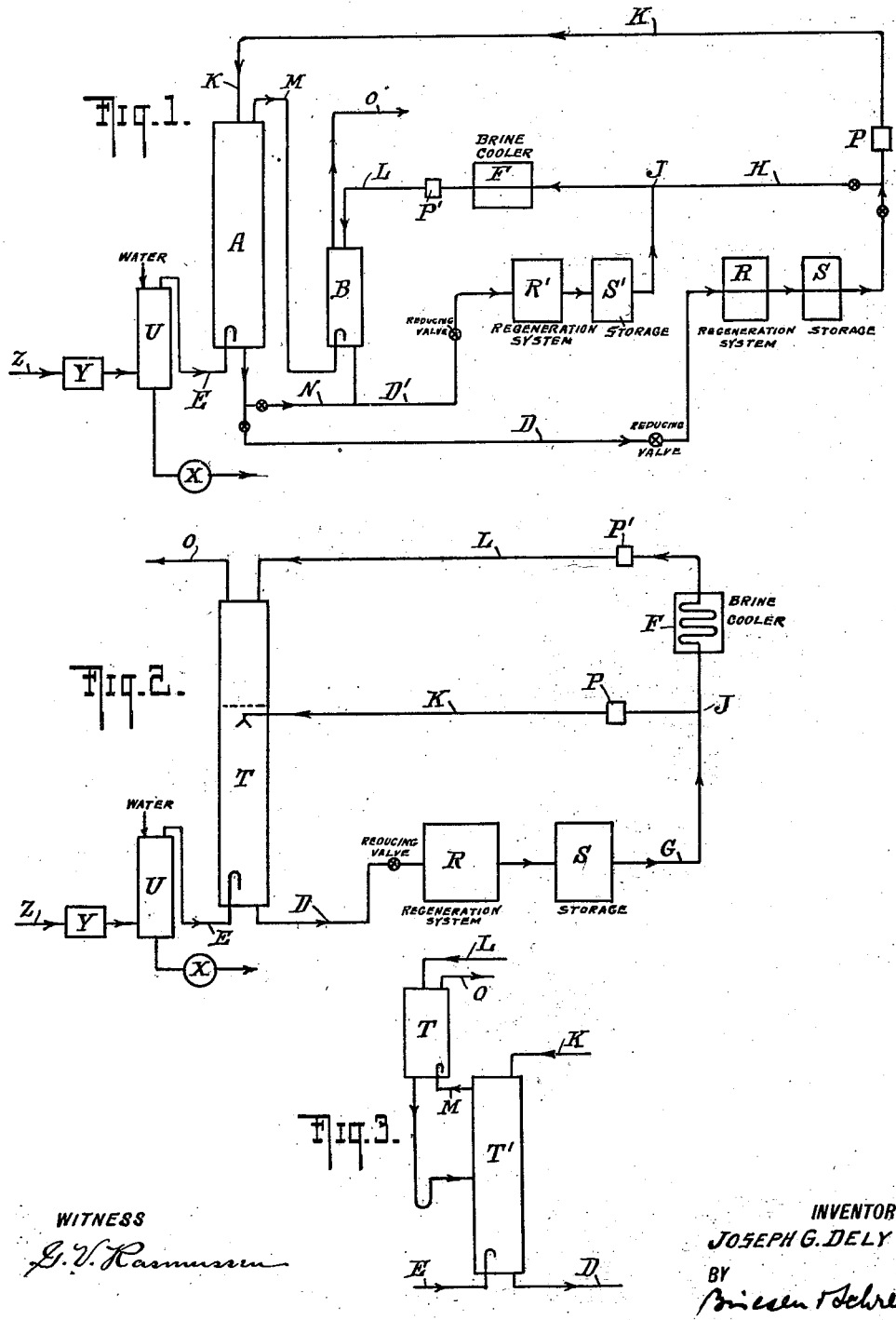

1,698,718

UNITED STATES PATENT OFFICE.

JOSEPH G. DELY, OF JAMAICA, NEW YORK, ASSIGNOR TO ATMOSPHERIC NITROGEN CORPORATION, OF SOLVAY, NEW YORK, A CORPORATION OF NEW YORK.

PROCESS OF PURIFYING GASES.

Application filed April 17, 1926. Serial No. 102,741.

This invention relates more particularly to methods of purifying ammonia synthesis gases for example in a process of the type known as the de Jahn process. According to the de Jahn procedure, a crude gas mixture, whose major ingredients are hydrogen, nitrogen, and CO, is subjected to catalytic treatment with steam under conditions which will result in a gas mixture containing hydrogen and nitrogen in a 3:1 ratio with $CO_2$, (carbon dioxide) CO, (carbon monoxide) and other substances in admixture therewith and from now on regarded as impurities. This gas mixture is subjected to a pressure approximating 100 atmospheres and under that pressure the gas stream is purified and is finally in its purified state introduced into a catalytic converter, wherein hydrogen and nitrogen combine to form ammonia, such ammonia being subsequently abstracted from the gases leaving the catalyst chamber or converter, while the remaining gases are returned to the system for further synthesis. The present invention is concerned with that phase of the de Jahn process which deals with the removal from the gases in the pressure system of the major part, that is substantially all, of their $CO_2$ and CO impurities. The object of the invention is to deal with this phase of the operations more efficiently and more economically than has heretofore been possible.

The process which is the subject of the present invention takes a course which is illustrated diagrammatically in the accompanying drawings in which Fig. 1 is a diagrammatic illustration of the pressure purification system especially elaborated with reference to the particulars involved in the new process. Fig. 2 is a view of a character similar to Fig. 1, illustrating a modification of the present invention and Fig. 3 shows a modification of a detail of Fig. 2.

In the drawings the line Z indicates a gas stream in which the nitrogen-hydrogen gas in the 1:3 relation, accompanied by impurities including CO, and $CO_2$ enter the compressor Y. The compressor Y subjects the gases to a pressure which may, for example, be approximately 100 atmospheres. The compressed gases enter the water scrubber U and pass out of the water scrubber through line E. The water, as it passes through the scrubber U, removes from the gas by far the major portion of such $CO_2$ as may be present in the gases, and then discharges through a Pelton wheel or equivalent means X for conserving energy. The gas stream in E, now containing as impurities its initial CO impurity and also relatively small quantities of $CO_2$, is now passed through a caustic solution at ordinary temperature and then into the tower A or it may pass directly into the scrubbing tower A. Scrubbing liquor consisting of a copper solution capable of absorbing CO and preferably consisting of an ammoniacal copper solution is introduced to the scrubbing tower through the line K. In case the gas stream to be purified is sufficiently free from $CO_2$ impurity not to require treatment for $CO_2$ removal at this point the copper solution need not be ammoniacal, although an ammoniacal solution is preferable in any event. When $CO_2$ is present in the gas mixture the ammoniacal copper solution, because of its free ammonia content, absorbs $CO_2$ and this absorption is favored by the fact that the copper solution is introduced into the tower A (Fig. 1) at about ordinary temperature. In the tower A, therefore, the larger part of the $CO_2$ impurity which may be present in the gas stream in the line E is removed. Of course the copper solution, being capable of absorbing CO, simultaneously removes in the tower A a portion of the CO content of the gas. The gas mixture leaves the tower A through the line M and undergoes further purification. The liquor leaving tower A passes through line D into the regeneration system R and thence into storage tank S. From the storage supply in S a pressure pump P feeds a constant supply of regenerated copper solution through line K into the top of tower A. The nature of the copper solution and of the steps employed in its regeneration are described in my Patent No. 1,597,345, issued August 24, 1926. Briefly stated, the regeneration consists in the expulsion from the spent liquor flowing through D, by means of heat, of $CO_2$, and CO, picked up by the liquor in its passage through tower A, the cuprous-cupric condition of the liquor being rejuvenated by passing air through the liquor, and the ammoniacal strength being maintained by the introduction into the liquor of the appropriate amount of ammonia. The regeneration steps in this case involve the application of heat, but not of refrigeration, at any point, and there is no expenditure of energy at any point in the circulating system D, R, S, P, K, A, which artificially refrigerates. The conditions are such as to maintain in the solution introduced into the tower A a temperature condition which approximates the prevailing normal atmospheric temperature of the works in which the process proceeds. The gases which leave the tower A (Fig. 1) undergo a purification treatment which is identical with the treatment described in my pending application hereinbefore identified. This treatment involves introducing the gases into a tower B, which is being continuously supplied through the line L with an ammoniacal copper solution of the same kind as the solution used in tower A but refrigerated to a temperature approximating 0° C., for example. This low temperature condition of the liquor in tower B favors the desired removal of the CO from the gas. The spent liquor in tower B is circulated through line D' and through a regenerator system R'. If desired, a storage tank S' may be used as a reservoir or this reservoir may be omitted. In either event, the regenerated solution from R' is circulated by means of pressure pump P' through the brine cooler F before the regenerated solution is permitted to enter the tower B through the line L. The foregoing treatment of the gases, first by a copper solution maintained at normal or moderate temperatures, followed by a treatment with a refrigerated copper solution of the same character, causes a purification which is relatively constant with respect to the minute quantities of CO and $CO_2$ impurities still carried in the gas stream leaving the system at O. The residual impurities in the gases leaving the system of Fig. 1 at O may be dealt with in a variety of ways, preferably in the manner described in my application Serial No. 663,662, of September 19, 1923, and in the patent application filed by Fredrik W. de Jahn, Serial No. 638,451, filed May 12, 1923, and which need not be described at length in this specification.

It is apparent that the process thus far described with reference to Fig. 1 may be modified by combining the regeneration systems R, S and R' and S'. In this case the spent liquor from tower A may flow, not through line D, but through the by-pass line N, be regenerated at R' and stored in S' and from S' a part of the unrefrigerated solution will be withdrawn through the by-pass line H in which the pressure pump P functions to establish the circulation through H, K, A, N, R', S'. In the meantime such of the regenerated solution as is required for tower B is diverted at J and sent through its refrigerating system F. When the system is thus operated the line D and the regenerator and storage systems R, S may be regarded as emergency systems and may be entirely omitted.

Returning next to Fig. 2, the system there shown functions in substantially the same manner as the system described with reference to Fig. 1, except that the refrigerated copper solution after use at its refrigerated temperature participates before its regeneration in the treatment of the gas with unrefrigerated solution. Thus in Fig. 2 the unrefrigerated copper solution is introduced through the line K at an intermediate point in the tower T, whereas the refrigerated solution is introduced through line L at the top of the tower T. It will be observed that in this instance the gases from E first come in contact with a copper solution at a moderate temperature and then, as the gases rise through tower T, they come in contact with the refrigerated copper solution, so that the effect is that of scrubbing the gas stream with a copper solution first at a moderate temperature and subsequently at a refrigerated temperature. The tower T may be divided into two towers T and T' as indicated in Fig. 3. This latter arrangement allows the originally refrigerated solution in T (Fig. 3) to be withdrawn into that part of tower T' wherein the solution approximates the condition of the spent solution from T. The spent liquor in Fig. 2 passes through line D to the regeneration system R, thence to storage S, then through line G to the branch J. At J a part of the solution is diverted through line K in such a manner that the solution will enter tower T at a moderate or normal temperature. At J another part of the regenerated solution is diverted through the brine cooler F and is then introduced through line L at approximately 0° C. into the top of the tower T.

It will be observed that in every case the major portion of the regenerated liquor is not caused to undergo refrigeration, but is led at an unrefrigerated temperature either to a separate scrubbing tower or to a predetermined point in a scrubbing tower into the top of which refrigerated liquor is fed, and that only a minor portion of the regenerated liquor is refrigerated.

The procedure which constitutes the subject matter of this application presents important advantages over the process described in my Patent No. 1,597,345, issued August 24, 1926. In the first place there is the saving in refrigeration. According to the present process, instead of refrigerating the total volume of circulating copper liquor, it is necessary to refrigerate only a part, say about one-fourth. In the second place, the new process involves an increased efficiency with respect to $CO_2$ removal. A further advantage with the new process, due to the increased $CO_2$ removal efficiency, is to be found in its relation to the water scrubbing operation at U. It has heretofore been customary to place the burden of removing substantially all of the $CO_2$ of the gases, on the water scrubber, which therefore requires a relatively large excess of water. According to the new process, the removal of these final fractions of $CO_2$ may be imposed upon the copper liquor, so that the water scrubber is not required to perform any further function than the removal of the more easily absorbed volumes of $CO_2$. The copper system also functions as a safeguard against the variation in $CO_2$ content of the exit gas from the water scrubber, arising from incidental changes in the operating conditions of the scrubber. Such changes may involve variations in the $CO_2$ content and volume of gas entering the scrubber, or changes in the temperature and volume of the water entering the scrubber, decreasing or deficient activity in the cold caustic solution when used, or other variables. Such variations, more or less minor in degree, are all within the limits of the $CO_2$ removal capacity of the copper solution, provided the proper temperature conditions are observed. By treating the gas mixture first with a solution at unrefrigerated temperature, a condition most favorable to the obsorption of $CO_2$ is established. By then following with the scrubbing of the gases by refrigerated liquor, conditions most favorable for the removal of the last portions of CO are established. The combined effect, therefore, of scrubbing the pressure gases first with water, then with unrefrigerated copper solution, and finally with a refrigerated copper solution, is to bring about a more uniform and reliable method of ridding the gases of their $CO_2$ and CO impurities, while at the same time bringing about this important effect by operating methods which represent economies over the less efficient methods thus far employed. When in the claims the phrase "gas containing an oxide of carbon impurity" is employed, it is intended to refer thereby to a gas which contains admixed with it, as an impurity, CO or CO together with $CO_2$.

I claim:

1. The process of purifying a flowing gas containing an oxide of carbon impurity which comprises passing the gas stream through three scrubbing stages, continuously introducing water to the first stage, continuously introducing ammoniacal cuprous liquor at an unrefrigerated temperature to the second stage, and continuously introducing ammoniacal cuprous liquor at a refrigerated temperature to the third stage.

2. The process which comprises subjecting a gas containing an oxide of carbon impurity to water scrubbing, then scrubbing the resultant gas mixture with ammoniacal copper liquor at approximately the prevailing atmospheric temperature, and then scrubbing with an ammoniacal copper liquor at a refrigerated temperature whereby the gas mixture is substantially freed of its $CO_2$ and CO impurities.

3. The process of purifying gas containing an oxide of carbon impurity which comprises scrubbing the gas with an ammoniacal copper solution having a lower temperature at the gas outlet than at the gas inlet, regenerating the said solution, diverting a portion of the regenerated solution, introducing said diverted portion at a predetermined point in the first step for re-use, refrigerating the remaining portion of the regenerated solution, and returning said refrigerated solution to a predetermined point in the first step for re-use, said refrigerated solution being returned to a point further along in the first step than that to which the diverted solution is returned.

4. That improvement in the process of purifying gas containing an oxide of carbon impurity with an ammoniacal copper solution in a regenerative system which comprises diverting a major portion of the regenerated solution for direct use in scrubbing the gas, scrubbing the gas therewith, refrigerating the minor portion of said regenerated solution and scrubbing the gas with the refrigerated portion of the solution following the step in which the gas was scrubbed with the unrefrigerated major portion of the regenerated solution.

5. The process of purifying gases containing an oxide of carbon impurity which comprises scrubbing the gas with ammoniacal copper solution at an unrefrigerated temperature and additionally scrubbing the gas with ammoniacal copper solution at a lower temperature than that of the first mentioned scrubbing step, regenerating the ammoniacal copper solution so used and thereby restoring it to its initial state, returning said regenerated solution to the scrubbing system and refrigerating before re-use as a scrubbing liquor that portion of said solution which is employed for scrubbing the gas at the lower temperature.

6. That improvement in the process of purifying a gas from CO by treatment with copper liquor which comprises scrubbing the gas at an unrefrigerated temperature with copper solution capable of absorbing CO and subsequently scrubbing the gas at a refrigerated temperature with copper liquor capable of absorbing CO.

7. In the process of purifying a gas of CO by treatment with copper liquor preparatory to the use of said gas in ammonia synthesis conducted under elevated pressure, that improvement which comprises scrubbing the gas under substantially the same elevated pressure at which the subsequent ammonia synthesis is conducted, with copper solution capable of absorbing CO, at an unrefrigerated temperature, and subsequently, under the same pressure, scrubbing the gas with copper solution capable of absorbing CO, at a refrigerated temperature.

8. The process which comprises preparing a gas mixture for use in ammonia synthesis, said mixture containing nitrogen and hydrogen as synthesis gases and CO as an impurity, and purifying said gas mixture of CO by scrubbing the gas mixture with copper solution capable of absorbing CO, at an unrefrigerated temperature, and subsequently scrubbing the thus scrubbed gas mixture with copper solution capable of absorbing CO, at a refrigerated temperature.

In testimony where I have hereunto set my hand.

JOSEPH G. DELY.